(12) United States Patent
Zhao et al.

(10) Patent No.: US 11,459,636 B2
(45) Date of Patent: Oct. 4, 2022

(54) METHOD AND SYSTEM FOR COMPREHENSIVE RECOVERY AND UTILIZATION OF COPPER-NICKEL SULFIDE ORE

(71) Applicant: CENTRAL SOUTH UNIVERSITY, Hunan (CN)

(72) Inventors: Zhongwei Zhao, Hunan (CN); Yongli Li, Hunan (CN); Xuheng Liu, Hunan (CN); Wanhai Xiao, Hunan (CN); Xingyu Chen, Hunan (CN); Jiangtao Li, Hunan (CN)

(73) Assignee: CENTRAL SOUTH UNIVERSITY, Hunan (CN)

( * ) Notice: Subject to any disclaimer, the term of this patent is extended or adjusted under 35 U.S.C. 154(b) by 365 days.

(21) Appl. No.: 16/529,729

(22) Filed: Aug. 1, 2019

(65) Prior Publication Data
US 2019/0352740 A1 Nov. 21, 2019

Related U.S. Application Data

(63) Continuation of application No. PCT/CN2018/082209, filed on Apr. 8, 2018.

(30) Foreign Application Priority Data

Apr. 10, 2017 (CN) .......................... 201710228509.5
Apr. 10, 2017 (CN) .......................... 201710229424.9

(51) Int. Cl.
*C22B 3/08* (2006.01)
*C22B 15/00* (2006.01)
(Continued)

(52) U.S. Cl.
CPC .............. *C22B 3/08* (2013.01); *C22B 3/3844* (2021.05); *C22B 15/0028* (2013.01); *C22B 15/0071* (2013.01); *C22B 23/043* (2013.01)

(58) Field of Classification Search
CPC ..... C22B 3/08; C22B 3/3844; C22B 15/0028; C22B 15/0071; C22B 23/043; C22B 11/023; C22B 15/001; C22B 23/00
(Continued)

(56) References Cited

U.S. PATENT DOCUMENTS 4,304,644 A * 12/1981 Victorovich .......... C22B 23/043
205/583

FOREIGN PATENT DOCUMENTS

CN 101285128 10/2008
CN 107012324 8/2017
(Continued)

OTHER PUBLICATIONS

Gouldsmith et al., Extraction and Reining of the Platinum Metals, Platinum Metals Rev. 1963, 7, (4), 136-143 (Year: 1963).*
(Continued)

*Primary Examiner* — Brian D Walck
*Assistant Examiner* — Danielle Carda
(74) *Attorney, Agent, or Firm* — JCIPRNET

(57) ABSTRACT

The present invention relates to the field of ore smelting technology, and particularly provides a method and system for comprehensive recovery and utilization of copper-nickel sulfide ore. Under normal pressure, the method can be used to directly leach copper-nickel sulfide ore concentrate or low-grade nickel matte obtained by matte smelting of copper-nickel sulfide ore. In the leaching process, the leaching rate of nickel, cobalt and iron is up to 99% or more, and copper is hardly leached, whereby the deep separation of copper from elements such as nickel and cobalt is directly realized, and the huge system for copper-nickel separation in the conventional process is omitted. Moreover, noble metals are not leached, and almost all of them remain in the leaching slag with copper, so the destiny is simple.

8 Claims, 1 Drawing Sheet

(51) Int. Cl.
    *C22B 3/00*     (2006.01)
    *C22B 3/38*     (2006.01)

(58) Field of Classification Search
    USPC .................................................. 75/424, 425
    See application file for complete search history.

(56) References Cited

FOREIGN PATENT DOCUMENTS

| | | |
|---|---|---|
| CN | 107058730 | 8/2017 |
| WO | 2010000029 | 1/2010 |

OTHER PUBLICATIONS

Yin Fei, et al., "Research on Pressure Leaching Process for Low Nickel Matte," Mining&Metallurgy, vol. 18, Dec. 2009, pp. 35-37.

* cited by examiner

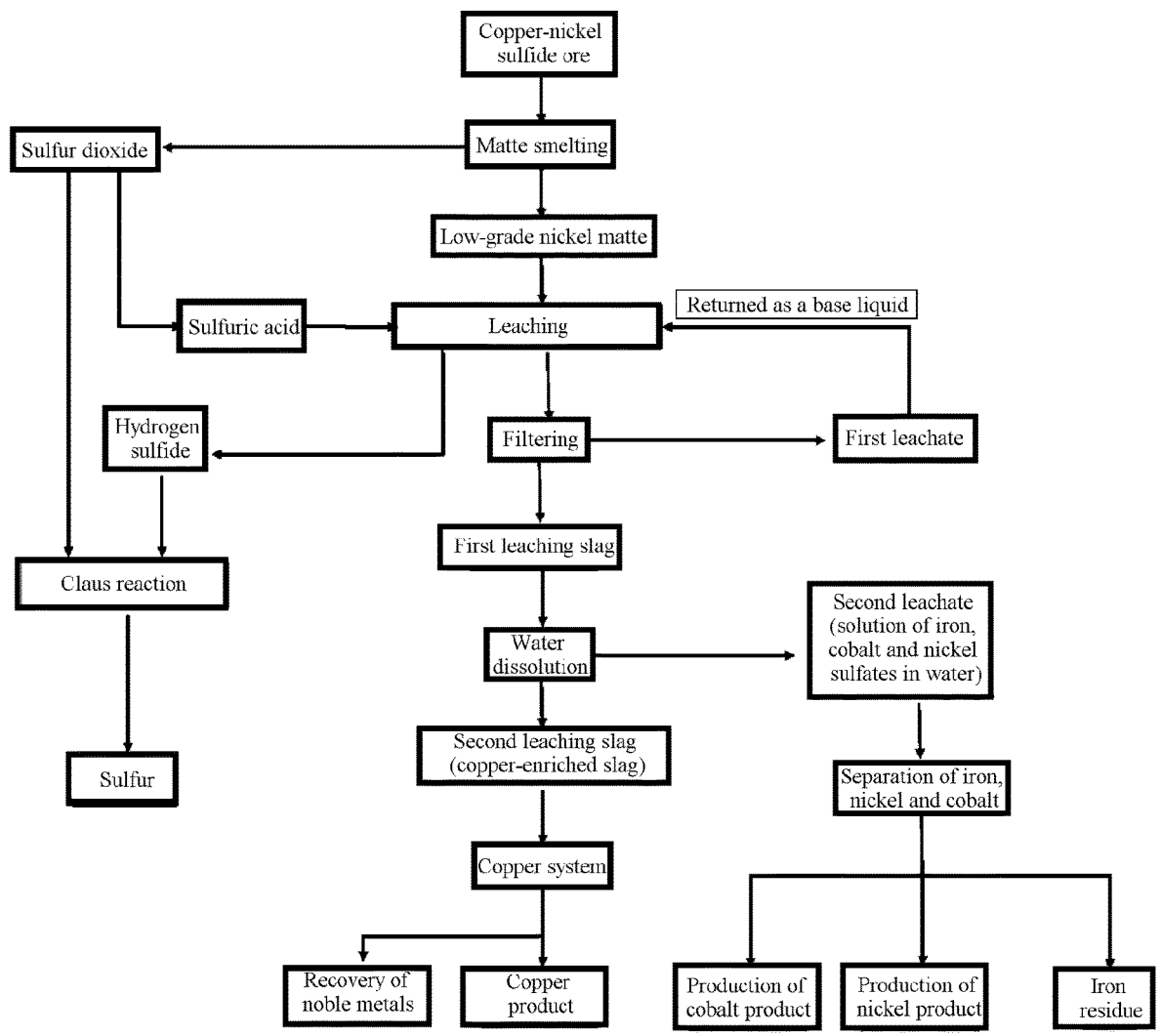

METHOD AND SYSTEM FOR COMPREHENSIVE RECOVERY AND UTILIZATION OF COPPER-NICKEL SULFIDE ORE

CROSS-REFERENCE TO RELATED APPLICATION

This application is a continuation of international PCT application serial no. PCT/CN2018/082209, filed on Apr. 8, 2018, which claims the priority benefit of China application no. 201710228509.5, filed on Apr. 10, 2017, and the priority benefit of China application no. 201710229424.9, filed on Apr. 10, 2017. The entirety of each of the above mentioned patent applications is hereby incorporated by reference herein and made a part of this specification.

BACKGROUND

Technical Field

The present invention relates to the field of non-ferrous metallurgy technology, and more particularly, to a method and system for comprehensive recovery and utilization of copper-nickel sulfide ore.

Related Art

Nickel is an important strategic metal widely used in national defense, aerospace, traffic and transportation, petrochemical, energy and other fields. A considerable amount of nickel ores are sulfide ores accompanied by copper, cobalt and noble metals (gold, silver and platinum metals), such as the copper-nickel ores in Jinchuan, Gansu and the copper-nickel ores in Kalatongke, Xinjiang. Therefore, in the extraction of nickel and copper, it is also necessary to consider the recovery of cobalt and noble metals.

The traditional copper-nickel sulfide ore smelting process is firstly enriching nickel, cobalt and copper in the form of sulfides by matte smelting to form low-grade nickel matte, in which the accompanying noble metals are also be enriched; and then subjecting the low-grade nickel matte to matte converting to remove most of the iron and sulfur to form a high-grade nickel matte. During the matte converting process, the oxidation loss of cobalt is often caused (about 40-60% loss, which is difficult to recover), and industrial sulfuric acid is obtained from the sulfur dioxide produced by an acid-making system (where the sulfuric acid is built up in large quantities due to the problems associated with the use and transportation radius). After that, the methods for treating the high-grade nickel matte obtained by matte converting are roughly classified into the following three kinds of methods.

A first method includes subjecting the high-grade nickel matte to grinding and floatation separation after slow cooling, to obtain a low-copper nickel sulfide concentrate, a low-nickel copper sulfide concentrate and a primary alloy respectively. The primary alloy also needs to be further subjected to sulfiding-grinding and floatation separation, to obtain a low-copper nickel sulfide concentrate, a low nickel copper sulfide concentrate, and a secondary alloy respectively. The secondary alloy is available for the recovery of noble metals, and the low-copper nickel sulfide concentrate is used for the extraction of nickel. However, due to the incomplete grinding and floatation separation, it is necessary to remove the carried impurity copper subsequently. The copper sulfide concentrate is used for the extraction of copper, and the problem of nickel carried as an impurity is accordingly also present. These cause the smelting process to be quite cumbersome.

In a second method, the high-grade nickel matte may also be treated by an acid-based selective leaching process including mainly low-acid oxygen pressure leaching or high-acid atmospheric leaching. Low-acid oxygen pressure leaching has been used in the Fukang smelting plant in China. It is reported that low-acid two-stage countercurrent leaching is employed in the Fukang smelting plant, and the process includes a stage of atmospheric leaching (where the final leaching solution has a pH of $\geq 6.2$), and then a stage of oxygen pressure leaching, in which the nickel sulfide, but not copper, is oxidation leached out by accurately controlling the partial pressure of oxygen (where the final leaching solution has a pH of 1.8-2.8 and the oxygen pressure is 0.05-0.06 MPa). A nickel sulfate solution with a Cu and Fe content of <0.01 g/L is obtained by two-stage countercurrent leaching, and almost all of the copper, noble metals, iron and sulfur and about 40% of the cobalt in the raw material remain in the final slag containing 2%-3% of nickel. The high-acid atmospheric leaching was first applied in the Kristiansund refinery. In the process, a high concentration of hydrochloric acid (275 g/L) is used as the leaching agent, and the rich leachate contains about 120 g/L of nickel, 160 g/L of hydrochloric acid, and iron, cobalt and copper of each 2 g/L. About 3% of the copper is leached out, with the majority remaining in the slag. Then, after iron, cobalt, and copper are separated by solvent extraction, the nickel chloride is crystallized by evaporation and concentration. In addition, Peng Shaofang et al studied the kinetics of leaching of high-grade nickel matte with sulfuric acid, and also proposed the use of intermittent two-stage countercurrent leaching. The main component in the high-grade nickel matte, $Ni_2S_3$, easily forms a refractory $\beta$-NiS phase at a lower temperature during the reaction with an acid, so the high-acid atmospheric decomposition process of high-grade nickel matte can be carried out effectively only at a temperature that is higher than 90° C.

In a third method, the high-grade nickel matte can also be leached with ammonia under a high pressure of oxygen. By controlling the free ammonia content in the solution and the oxygen pressure, the copper, nickel, and cobalt are dissolved by converting them into a metal-ammonia complex, sulfur is oxidized into sulfate, and noble metals and iron are formed into the slag phase for recovery. The control of free ammonia during leaching is particularly important. A low concentration results in a low leaching rate. If the concentration is too high, a high-ammonia complex of cobalt is formed, which causes loss of cobalt due to its insolubility.

All of the above three technical ideas can be used to treat high-grade nickel matte. However, a problem exists that during the process of matte converting of low-grade nickel matte into high-grade nickel matte, most of the cobalt enters the converting slag, and the primary yield of cobalt is low. In addition, due to the long process, about 10-20% of the platinum-group metals is lost.

To recover the cobalt lost in the converting slag, the converting slag is treated by a pyro-metallurgical process, and then the lost cobalt is recovered by reduction smelting. The main components in the reduced product are iron cobalt nickel alloys and sulfides, which is cobalt-nickel matte. However, since cobalt is susceptible to oxidization, low in content, and unduly dispersed in the converting slag, only a part of cobalt can be recovered even by reduction smelting. In addition, this leaching of cobalt-nickel matte is very complicated and requires three stages of leaching. The first stage is mainly leaching of alloys. To prevent the leaching of copper, hydrogen sulfide or sodium sulfide needs to be introduced during or after leaching. A cobalt-containing solution can be obtained from the formed leaching slag only after two additional stages of leaching. Thus, a large amount of iron is cycled to/from the sulfide phase from/to slag phase, and the recovery process is also cumbersome.

In general, although the matte converting of low-grade nickel matte into high-grade nickel matte well solves the recovery of copper and nickel, there are serious problems in the recovery of accompanying cobalt and noble metals. Moreover, sulfur is produced in the form of sulfuric acid, and the marketing and transportation radius are also a troublesome problem.

Direct treatment of low-grade nickel matte is expected to avoid the loss of accompanying valuable elements such as cobalt and noble metals during the matte converting process. However, the existing methods of treating low-grade nickel matte are still inconvenient in recovering accompanying valuable metals. For example, the sulfatizing roasting of low-grade nickel matte converts nickel cobalt copper into a water-soluble sulfate, and converts iron into a water-insoluble oxide, and the resulting sulfur dioxide is still used for acid production. However, the accompanying platinum group metals remain in the iron slag and require a specialized complex process for extraction. Low-grade nickel matte can also be treated by oxygen pressure acid leaching, as described in the study by Yin Fei and Deng Zhilin et al. However, the sulfur formed by oxidation forms a retardation film which affects the leaching. In addition, upon oxygen pressure leaching, a considerable amount of iron is converted into iron slag, which is advantageous for subsequent nickel-cobalt extraction. However, noble metals and inclusions thereof cause difficulty in recovery. In addition, sulfide is oxidized into sulfur and enters the slag phase during the leaching process, and further oxidation is required to recover noble metals.

In general, the existing direct treatments of low-grade nickel matte include pyro- and hydro-metallurgical processes. Sulfatizing roasting may be used in the pyro-metallurgical process, and then valuable elements are selectively leached out, with iron oxide remaining in the leaching slag. However, the noble metals in the iron slag are difficult to recover. Many people prefer the hydro-metallurgical process, in which oxygen pressure leaching is generally used. The process requires an autoclave and pure oxygen, but also encounters the problem of recovering noble metals from iron slag. Moreover, an envelope is formed by the sulfur formed through oxidation of sulfide during oxygen pressure acid leaching, so the recovery of noble metals is still difficult.

SUMMARY

The technical problem to be solved by the present invention is that the recovery of each element cannot be effectively achieved in the existing copper-nickel sulfide ore smelting process, particularly the recovery rates of element cobalt and noble metals are too low.

Solution to the Problems

Technical Solution

To solve the above technical problems, the present invention provides a method for comprehensive recovery and utilization of copper-nickel sulfide ore, which includes the following steps:

1) selective leaching, including:
obtaining a nickel-iron-cobalt-enriched leachate and a copper-enriched leaching slag by selective leaching, in which
the selective leaching is a method for recovering the main accompanying elements from the copper-nickel sulfide ore, which includes the following selective leaching steps:
selectively leaching by continuously adding low-grade nickel matte obtained by matte smelting of copper-nickel sulfide ore and a leaching reaction solution to a reaction base liquid, and collecting gaseous hydrogen sulfide, a first leachate, and a first leaching slag respectively, where the reaction base liquid is a 20 wt %-60 wt % sulfuric acid solution, and the leaching reaction solution is a 60 wt %-95 wt % sulfuric acid solution; and adding water to dissolve the first leaching slag, and collecting a second leachate and a second leaching slag respectively, where as the reaction progresses, the temperature of the system will be adjusted automatically; and
where the second leachate is a nickel-iron-cobalt-enriched leachate; and the second leaching slag is a copper-enriched leaching slag;

2) removing iron from the nickel-iron-cobalt-enriched leachate obtained in step 1), and collecting an iron removed liquid and an iron residue respectively, where the iron removed liquid is used for the extraction of nickel and cobalt, and the iron residue is used for iron making; and/or
smelting the copper-enriched leaching slag obtained in the step 1) in a copper smelting system to obtain copper and noble metals, respectively.

In the present invention, a high-concentration sulfuric acid solution is used to directly treat a copper-nickel sulfide ore or a low-grade nickel matte obtained by matte smelting of the copper-nickel sulfide ore. By taking advantage of their low solubilities in a high-concentration sulfuric acid solution, nickel, cobalt and iron sulfates are crystallized out and enter the slag phase, which in turn can be separated from the high-concentration sulfuric acid solution by filtration.

The low-grade nickel matte is mainly derived from copper-nickel sulfide concentrate, and has a main composition of $Ni_5Fe_4S_8$. In addition to nickel, the abundant copper, cobalt and a large amount of platinum group metals need to be recovered. In the solution of the present invention, the low-grade nickel matte is produced by matte smelting of a copper-nickel sulfide ore. That is, the method of the present invention is more suitable for the breakdown of and extraction from low-grade nickel matte produced by matte smelting of copper-nickel sulfide ore.

The method of the present invention actually aims at solving the technical problems that the existing solutions have difficulties in well recovering the valuable elements. Through the creative idea of crystallization while leaching with high acid, the low-grade nickel matte is directly subjected to atmospheric leaching with sulfuric acid, without conventional converting, which converts iron, nickel and cobalt from sulfides into sulfate crystals; and then water leaching is performed, to obtain the solution of iron, nickel and cobalt sulfates and the second leaching slag enriched with copper and noble metals, thereby achieving the purpose of separating copper and noble metals from iron, nickel and cobalt. Subsequently, the leachate is subjected to iron removal treatment, and the iron in the leachate is converted into goethite or hematite to realize the separation of iron from nickel-cobalt. Finally, the separation of nickel from cobalt is effected.

In the solutions of the present invention, the matte converting of the low-grade nickel matte in the conventional method is eliminated, so the loss of cobalt caused during the matte converting process is effectively prevented. Meanwhile, by using the leaching step, copper and noble metals are effectively retained in the leaching slag, and then the leaching slag is sent to a copper smelting system for smelting. At this time, the noble metals tends to the simple destiny, and can be effectively recovered. In this way, the recovery rate of accompanying cobalt and platinum group metals in the copper-nickel sulfide ore is improved.

In the present invention, a high-concentration sulfuric acid solution is used to directly treat a low-grade nickel matte obtained by matte smelting of the copper-nickel sulfide ore. By taking advantage of their low solubilities in a high-concentration sulfuric acid solution, nickel, cobalt and iron sulfates are crystallized out and enter the slag phase, which in turn can be separated from the high-concentration sulfuric acid solution by filtration. During the leaching process, cuprous sulfide and noble metals do not participate in the reaction and remain in the slag too. The leaching slag containing crystalline nickel, cobalt, and iron sulfate, cuprous sulfide and noble metals is leached by water to dissolve the sulfates. After filtration, a secondary slag of copper sulfide and noble metals and an aqueous solution containing nickel, cobalt and iron sulfate is obtained. The secondary slag is then sent to a copper smelting system to recover copper and noble metals. Corresponding products can be obtained by removing iron from nickel-cobalt-iron, and then separating nickel from cobalt by extraction. In the present invention, the direct treatment of a copper-nickel sulfide concentrate or a low-grade nickel matte obtained by matte smelting of copper-nickel sulfide ore can avoid the problem of loss of accompanying valuable elements such as cobalt and noble metals in the conventional smelting process. In the present invention, the separation of iron-nickel-cobalt sulfates from the high-concentration sulfuric acid is achieved by taking advantage of their crystallization from the leachate due to saturation. The separation of copper from iron-nickel-cobalt is achieved after the primary filter residue is simply dissolved in water. Meanwhile, by using the leaching step, copper and noble metals are effectively retained in the secondary leaching slag, and then the leaching slag is sent to a copper smelting system for smelting. At this time, the noble metals tend to the simple destination, and can be effectively recovered. In this way, the recovery rate of accompanying cobalt and platinum group metals in the copper-nickel sulfide ore is improved. Corresponding treatments may be made by those skilled in the art to the second leachate or the second leaching slag according to actual needs to recover the accompanying elements such as nickel, cobalt, iron, copper and noble metals.

Preferably, in the actual operation, the leaching reaction usually take place in a reaction vessel, that is, the step 1) may be: filling the reaction vessel with a reaction base liquid, namely, a 20 wt % to 60 wt % sulfuric acid solution; and adding a low-grade nickel matte (or a copper-nickel sulfide ore) and a leaching reaction solution that is a 60 wt %-95 wt % sulfuric acid solution to the reaction vessel, and reacting.

In a preferred embodiment, to enable the iron-nickel-cobalt sulfates to crystallize from the leaching reaction solution due to saturation, the leaching reaction solution and the low-grade nickel matte are continuously added, and the consumption of the sulfuric acid in the reaction vessel is maintained to be in accord with the amount added. The reaction is performed with continuous feed.

In a preferred embodiment of the present invention, to make the reaction more complete and to control the concentration of sulfuric acid in the end reaction solution, the reaction vessel is usually filled with the reaction base liquid, that is, 20 wt %-60 wt % sulfuric acid solution, of 30%-60% of the total volume of the reaction vessel.

In a preferred embodiment of the present invention, the leaching is continued for additional 0.5-2 h after the completion of the feed. In a preferred embodiment, the feed may be stopped until the slurry in the reaction vessel reaches 80% of the total volume of the reaction vessel, the reaction is continued for additional 0.5-2 h, and the gaseous hydrogen sulfide, the first leachate and the first leaching slag formed during the reaction are collected.

In the leaching process, to make the leaching in the step 1) more complete and separate the nickel from copper completely, the selective leaching is atmospheric non-oxidative leaching, and no additional heating equipment is required, since with the continuous feed of the low-grade nickel matte and 60%-95% sulfuric acid, the reaction temperature of the solution will rise to 80-100° C.

In the step 1), the low-grade nickel matte and the leaching reaction solution are continuously added concurrently, and the amounts added are the same as the consumption. The first leachate is returned back and recycled as the reaction base liquid for the next batch of materials.

When the first leachate and the first leaching slag are obtained, the first leachate is recovered as a reaction base liquid and recycled back to the reaction vessel for treating the next batch of materials, thus greatly reducing the acid consumption and environmental pollution, and improving the metal recovery rate. The first leaching slag can be pumped into a dissolution tank containing deionized water. At this time, the nickel sulfate, cobalt sulfide, and ferrous sulfate crystals precipitated due to supersaturation during the leaching reaction are re-dissolved and then secondarily filtered. A second leachate containing nickel sulfate, cobalt sulfate, and ferrous sulfate, and a second leaching slag enriched with cuprous sulfide and noble metals are separately collected.

To solve the problem associated with the destiny of sulfur which has long plagued the nickel sulfide ore mining enterprise, in a preferred embodiment of the present invention, the gaseous hydrogen sulfide collected after selective leaching and the sulfur dioxide generated during matte smelting are sent to a sulfur system to prepare sulfur, and the excess sulfur dioxide is supplied to a sulfuric acid system to prepare sulfuric acid for formulation into a sulfuric acid solution, that is, the leaching reaction solution and the reaction base liquid. In a preferred embodiment of the present invention, a part of the produced sulfur dioxide is used to produce an acid that serves as a leaching agent, and a part of the sulfur dioxide is reacted with the generated hydrogen sulfide to form sulfur, thereby solving the problem of buildup of a large amount of sulfuric acid in the conventional process. In addition, in the present invention, the gaseous hydrogen sulfide produced by the low-grade nickel matte in the sulfuric acid leaching process is used to prepare sulfur, which can solve the problem associated with the destiny of sulfur which has long plagued the nickel sulfide ore mining enterprises. Sulfur is convenient for storage and transport compared with the case in the conventional process in which hydrogen sulfide is used to prepare sulfuric acid.

After the leaching step, the iron removal from the leachate, or the sending of the leaching slag to a copper smelting system for smelting, or both the iron removal from the leachate and the sending of the leaching slag to a copper smelting system for smelting may be performed by those skilled in the art according to actual needs. Preferably, both the iron removal from the leachate to recover nickel, cobalt, and/or iron and the sending of the leaching slag to a copper smelting system for smelting to recover copper and noble metals are performed.

In the present invention, the iron in the leachate is mainly present in the form of divalent iron ions. For example, the copper content in the solution in the second leachate in the present invention is less than 0.009 g/L, and preferably less than 0.003 g/L. The iron is mainly present in the form of divalent iron ions. The iron removal method commonly used in the art can be used to remove iron without further reduction, and the iron can be directly oxidized to form goethite or hematite. To better remove iron without affecting the recovery of nickel-cobalt, in a preferred embodiment of the present invention, it is preferred to use the goethite method or the hematite method.

In the step 2), the iron removal from the leachate is specifically:

introducing an oxygen-rich gas into the leachate or the leachate having a pH adjusted to 3 to 7, to obtain an iron removed liquid and an iron residue;

alternatively, adding the leachate to an autoclave and reacting with an oxidizing gas, after the reaction is completed, performing solid-liquid separation, where the filter residue is washed and dried to obtain an iron residue; and the obtained filtrate is an iron removed liquid.

Preferably, the leachate in the step 1) is adjusted to pH 4-7, and placed in a closed autoclave.

Pure oxygen is introduced and heated to 220° C., and the iron is removed as hematite to obtain an iron removed liquid and an iron residue.

Preferably, it is also possible to introduce air or oxygen-enriched air into the leachate in the step 1) while the solution is maintained at pH 3-4, and then the iron is removed in the form of goethite to obtain an iron removed liquid and an iron residue. The obtained iron residue is baked into an iron concentrate for iron making.

Preferably, in the iron removal process, the temperature at which the reaction with the oxidizing gas occurs is 150 to 200° C., the partial pressure of oxygen in the reaction vessel is maintained at 0.1 to 1 MPa, and the reaction time is 1 to 5 hours.

The obtained iron residue is baked into an iron concentrate for iron making, or the iron residue may be used as a raw material for lithium iron phosphate.

The iron removed liquid can be used in the extraction of nickel and cobalt through methods commonly used in the art. To fully realize the extraction of nickel and cobalt in the present invention, in a preferred embodiment, the pH of the iron removed liquid is adjusted to 4.0-5.5, and then an extracting agent is added to the iron removed liquid, and a cobalt-containing solution and a nickel-containing solution are obtained after extraction and separation. The nickel-containing solution is adjusted to pH 5.5-7.0, and extracted for nickel with the extracting agent, where the extracting agent is a 10-50 vol % solution of P507 or Cyanex 272 in kerosene. In the extracting agent, kerosene is a diluent. P507 is mono(2-ethylhexyl) 2-ethylhexylphosphonate, and Cyanex272 is bis(2,4,4-trimethylpentyl)phosphinic acid.

When the extracting agent is a solution of P507 in kerosene, the pH of the iron removed liquid is adjusted to 4.0-5.0, and then the extracting agent is added to the iron removed liquid. The cobalt is extracted with the extracting agent, and a cobalt-containing solution (cobalt-containing organic phase) and a nickel-containing solution are obtained after extraction and separation. The pH of the nickel-containing solution is adjusted to 5.5-6.5, the nickel is extracted with the extracting agent, and back extracted with hydrochloric acid to obtain a nickel chloride solution, which is used to prepare a nickel product. The cobalt-containing solution (cobalt-containing organic phase) is back extracted with hydrochloric acid to obtain a cobalt chloride solution, which is used to prepare a cobalt product.

When the extracting agent is a solution of Cyanex272 in kerosene, the pH of the iron removed liquid is adjusted to 5.0-5.5, and then the extracting agent is added to the iron removed liquid. A cobalt-containing solution (cobalt-containing organic phase) and a nickel-containing solution are obtained after extraction and separation. The pH of the nickel-containing solution is adjusted to 6.5-7.0, the nickel is extracted with the extracting agent, and back extracted with sulfuric acid to obtain a nickel sulfate solution, which is used to prepare a nickel sulfate product. The cobalt-containing solution (cobalt-containing organic phase) is back extracted with sulfuric acid to obtain a cobalt sulfate solution, which is used to prepare a cobalt sulfate product.

The leaching rate of nickel, iron and cobalt achieved by the method of the present invention is above 99%, cobalt and noble metals are effectively recovered, the recovery rate of copper is above 98%, and the recovery rate of noble metals is above 95%.

According to another aspect of the present invention, a system for comprehensive recovery and utilization of copper-nickel sulfide ore is further provided, which includes: a unit for obtaining a leachate and a leaching slag, which is a selective leaching unit and a water dissolution unit, or an atmospheric selective leaching unit, in which the selective leaching unit has respective continuous feed inlets for a low-grade nickel matte and a leaching reaction solution, and the selective leaching unit contains a reaction base liquid, and allows a selective leaching reaction of a low-grade nickel matte obtained by matte smelting of copper-nickel sulfide ore and a leaching reaction solution when added continuously to the reaction base liquid; and the selective leaching unit further includes a gaseous hydrogen sulfide collection device, a first leachate collection device, and a first leaching slag collection device, where the reaction base liquid is a 20-60 wt % sulfuric acid solution, and the leaching reaction solution is a 60-95 wt % sulfuric acid solution;

the water dissolution unit is used to dissolve the first leaching slag in water, to collect a second leachate and a second leaching slag respectively; and the atmospheric selective leaching unit is used to subject a low-grade nickel matte directly to atmospheric selective leaching with sulfuric acid, to collect gaseous hydrogen sulfide, a leachate, and a leaching slag respectively;

an iron removal unit, for removing iron from the second leachate obtained in the water dissolution unit, or for removing iron from the leachate obtained in the atmospheric selective leaching unit;

a nickel and cobalt extraction unit, for collecting an iron removed liquid obtained in the iron removal unit and for extracting nickel and cobalt;

an iron making unit, for treating an iron residue obtained in the iron removal unit and for iron making; and/or a copper smelting unit, for performing copper smelting on the second leaching slag or the leaching slag obtained in the atmospheric selective leaching unit, to obtain copper and noble metals, respectively.

In a preferred embodiment of the present invention, the system further includes:

a matte smelting unit, for treating a copper-nickel sulfide ore, and supplying a low-grade nickel matte to the atmospheric selective leaching unit, where the low-grade nickel matte is produced by matte smelting of the copper-nickel sulfide ore;

a sulfur production unit, for allowing the sulfur dioxide generated in the matte smelting unit to completely react with the gaseous hydrogen sulfide generated in the atmospheric selective leaching unit to produce sulfur; and a sulfuric acid production unit, for converting remaining sulfur dioxide generated in the matte smelting unit into sulfuric acid and supplying the sulfuric acid to the atmospheric selective leaching unit.

In a preferred embodiment of the present invention, the first leachate collection unit in the system can also be used to supply a reaction base liquid to the selective leaching device.

The method of the present invention is preferably carried out in the system of the present invention.

The present invention is preferably implemented by the following specific embodiments.

A method for recovering the main accompanying elements from the copper-nickel sulfide ore includes:

1) continuously adding a low-grade nickel matte obtained by matte smelting of a copper-nickel sulfide ore and a leaching reaction solution to a reaction base liquid, selectively leaching, and collecting gaseous hydrogen sulfide, a first leachate, and a first leaching slag respectively, where the reaction base liquid is a 20 wt %-60 wt % sulfuric acid solution, and the leaching reaction solution is a 60 wt %-95 wt % sulfuric acid solution;

2) adding water to dissolve the first leaching slag, and collecting a second leachate and a second leaching slag respectively;

3) removing iron from the second leachate, and collecting an iron removed liquid and an iron residue respectively, where the iron removed liquid is used for the extraction of nickel and cobalt, and the iron residue is used for iron making; and/or smelting the second leaching slag in a copper smelting unit to obtain copper and noble metals, respectively.

Preferably, the selective leaching is atmospheric non-oxidative leaching; and/or the leaching reaction solution is a 85-90 wt % sulfuric acid solution.

Preferably, the low-grade nickel matte and the leaching reaction solution are continuously added concurrently, and the amounts added are the same as the consumption. The first leachate is returned back and recycled as the reaction base liquid for the next batch of materials.

Preferably, the leaching is continued for additional 0.5-2 h after the addition is completed in the step 1).

Preferably, the sulfur dioxide generated in the matte smelting is reacted with the gaseous hydrogen sulfide generated in the step 1) to prepare sulfur, and the remaining sulfur dioxide is converted into a sulfuric acid solution for use in the atmospheric selective leaching in the step 1).

Preferably, the iron removal from the second leachate in the step 3) is specifically as follows:

An oxygen-rich gas is introduced into the second leachate, to obtain an iron removed liquid and an iron residue.

Preferably, the extraction of nickel and cobalt from the iron removed liquid in the step 3) is specifically:

adjusting the pH of the iron removed liquid to 4.0-5.5, and then adding an extracting agent to the iron removed liquid, obtaining a cobalt-containing solution and a nickel-containing solution after extraction and separation, adjusting the nickel-containing solution to pH 5.5-7.0, and extracting nickel with the extracting agent.

The extracting agent is a 10-50 vol % solution of P507 or Cyanex 272 in kerosene.

Preferably, the method for recovering copper and noble metals is specifically as follows.

The second leaching slag is subjected to matte converting to produce crude copper, which is then electrolyzed to obtain refined copper and an anode slime enriched with noble metals, where the anode slime is used for extracting noble metals.

Alternatively, the second leaching slag is subjected to oxidizing roasting and then to acid leaching, to collect a copper-enriched leachate and a noble metal-enriched leaching slag separately, where the leaching slag is used for extracting noble metals.

Alternatively, the second leaching slag is subjected to oxygen pressure leaching, to collect a copper-enriched leachate and a noble metal-enriched leaching slag separately, where the leaching slag is used for extracting noble metals.

A system for recovering the main accompanying elements from the copper-nickel sulfide ore includes:

a selective leaching unit, having respective continuous feed inlets for a low-grade nickel matte and a leaching reaction solution, where the selective leaching unit contains a reaction base liquid, and allows a selective leaching reaction of a low-grade nickel matte obtained by matte smelting of copper-nickel sulfide ore and a leaching reaction solution when added continuously to the reaction base liquid; and the selective leaching unit further includes a gaseous hydrogen sulfide collection device, a first leachate collection device, and a first leaching slag collection device, and where the reaction base liquid is a 20-60 wt % sulfuric acid solution, and the leaching reaction solution is a 60-95 wt % sulfuric acid solution;

a water dissolution unit, for dissolving the first leaching slag in water, to collect a second leachate and a second leaching slag respectively;

an iron removal unit, for removing iron from the second leachate obtained in the water dissolution unit;

a nickel and cobalt extraction unit, for collecting an iron removed liquid obtained in the iron removal unit and for extracting nickel and cobalt; an iron making unit, for collecting an iron residue obtained in the iron removal unit and for iron making; and/or a copper smelting unit, for performing copper smelting on the second leaching slag, to obtain copper and noble metals, respectively.

The system further includes a sulfur production unit, for allowing the sulfur dioxide generated in the matte smelting to react with the gaseous hydrogen sulfide generated in the atmospheric selective leaching unit to produce sulfur; and a sulfuric acid production unit, for converting part of the sulfur dioxide generated in the matte smelting into sulfuric acid and supplying the sulfuric acid to the atmospheric selective leaching unit.

Beneficial Effects

In the method and system for comprehensive recovery and utilization of copper-nickel sulfide ore, by taking advantage of the property that the nickel, iron, and cobalt sulfate crystals have decreased solubility in a solution with high content of an acid, a low-grade nickel matte and a leaching reaction solution (that is, a 60-95 wt % sulfuric acid solution) are added concurrently and reacted continuously, in the presence of a base liquid having an acidity (that is, a 20-60 wt % sulfuric acid solution), such that the produced nickel, iron, and cobalt sulfates are crystallized out due to saturation. The first filtrate obtained by filtration can be recycled as a base liquid. The first filter residue contains nickel sulfate, cobalt sulfate and iron sulfate crystals precipitated by saturation, and cuprous sulfide and noble metals which are difficult to be leached by sulfuric acid, and is dissolved in water to obtain a solution of nickel, cobalt and iron sulfates, and a residue enriched with cuprous sulfide and noble metals, thus achieving the deep separation of copper from nickel, cobalt and iron. The solution of nickel, cobalt and iron sulfates is removed of iron and then extracted for nickel sulfate and cobalt sulfate. Copper and noble metals can be effectively recovered from the residue enriched with cuprous sulfide and noble metals after traditional copper smelting and noble metals recovery processes. The generated gaseous hydrogen sulfide reacts with the sulfur dioxide generated by matte smelting to prepare high-purity sulfur, which is convenient in transportation and storage. The method has short process and high efficiency, and can not only realize the deep separation of nickel from copper, but also greatly improve the recovery rate of cobalt and noble metals. It is a clean and efficient comprehensive utilization process of elements and is useful in large-scale industrial production.

BRIEF DESCRIPTION OF THE DRAWINGS

The accompanying drawing is included to provide a further understanding of the invention, and are incorporated in and constitute a part of this specification. The drawing illustrates embodiments of the invention and, together with the description, serve to explain the principles of the invention.

FIG. 1 is a flowchart illustrating a method for recovering the main accompanying elements from the copper-nickel sulfide ore according to an embodiment of the present invention.

DETAILED DESCRIPTION

The specific embodiments of the present invention will be described in further detail with reference to enbodiments. The following examples are intended to illustrate the present invention, rather than limiting the scope of the present invention.

A method for recovering the main accompanying elements from the copper-nickel sulfide ore is specifically embodied by Enbodiments 1-4.

Enbodiment 1

In this example, a copper-nickel sulfide ore was subjected to matte smelting to obtain a low-grade nickel matte including mainly 20.21% of Ni, 10.52% of Cu, 37.44% of Fe, 0.78% of Co, and about 10 g/t of noble metals, and sulfur dioxide was generated at the same time.

A 30 wt % sulfuric acid solution was formulated and used as a reaction base liquid, and a 90 wt % sulfuric acid solution was formulated and used as a leaching reaction solution. A reactor was filled with the reaction base liquid that is 40% based on the total volume of the reactor. Then, a low-grade nickel matte and the leaching reaction solution were added concurrently to the reactor and reacted, and the consumption of sulfuric acid in the reactor was maintained in accordance with the amount added. The materials were continuously fed and reacted, until the slurry in the reactor reached 80% of the total volume of the reactor. At this time, the feed was stopped, the reaction was continued for an additional 1 h, and the gaseous hydrogen sulfide formed during the reaction was collected.

After the completion of the reaction, the slurry was cooled to room temperature and then filtered to obtain a first filtrate and a first filter residue. The filtrate was used as the reaction base liquid for the next leaching. The first filter residue was pumped into a dissolution tank containing deionized water. After the nickel sulfate, cobalt sulfate, and ferrous sulfate crystals precipitated by saturation during the reaction were re-dissolved, the solution was filtered again to obtain a second filtrate containing nickel sulfate, cobalt sulfate, and ferrous sulfate, and a second filter residue enriched with cuprous sulfide and noble metals, whereby the separation of copper from nickel and cobalt was realized. The copper content in the filtered solution was less than 0.003 g/L, and the iron was mainly in the form of divalent iron ions and could be directly oxidized by air without reduction while the pH of the solution was maintained at 3-4, so that the iron was precipitated and removed in the form of goethite. The obtained iron slag was calcined into an iron concentrate, which can be used for iron making. The iron removed liquid was adjusted to pH 4, and cobalt was extracted with P507, and back extracted with hydrochloric acid to obtain a cobalt chloride solution, which can be used to prepare a cobalt product. The solution was then adjusted to pH 5.5, and nickel was extracted with P507, and back extracted with hydrochloric acid to obtain a nickel chloride solution, which can be used to prepare a nickel product.

The second filter residue was cuprous sulfide enriched with noble metals and had a composition mainly including 0.49% of Ni, 73.2% of Cu, 0.72% of Fe, <0.009% of Co, and about 67 g/t of noble metals (amounting to a leaching rate of nickel, iron and cobalt of above 99%). The solid filter residue was directly subjected to matte converting to prepare crude copper, the crude copper was refined by electrolytic refining to obtain refined copper, and the noble metals are enriched in the anode slime, and sent to a noble metal system for recovery. The recovery rate of copper is up to 98% or higher, and the recovery rate of noble metals is over 95%. Part of the sulfur dioxide generated during the matte smelting process was reacted with hydrogen sulfide to produce sulfur, where the amount of sulfur dioxide was one half the molar amount of hydrogen sulfide; and the remaining sulfur dioxide was sent to the sulfuric acid system to produce sulfuric acid which was formulated into the reaction base liquid and leaching reaction solution.

Enbodiment 2

A copper-nickel sulfide ore was subjected to matte smelting to obtain a low-grade nickel matte including mainly 13.25% of Ni, 8.32% of Cu, 38.44% of Fe, 0.64% of Co, and about 8 g/t of noble metals, and sulfur dioxide was generated at the same time.

A 40 wt % sulfuric acid solution was formulated and used as a reaction base liquid, and a 85 wt % sulfuric acid solution was formulated and used as a leaching reaction solution. A reactor was filled with the reaction base liquid that is 45% based on the total volume of the reactor. Then, a low-grade nickel matte and the leaching reaction solution were added concurrently to the reactor and reacted, and the consumption of sulfuric acid in the reactor was maintained in accordance with the amount added. The materials were continuously fed and reacted, until the slurry in the reactor reached 80% of the total volume of the reactor. At this time, the feed was stopped, the reaction was continued for an additional 1.5 h, and the gaseous hydrogen sulfide formed during the reaction was collected.

After the completion of the reaction, the slurry was cooled to room temperature and then filtered to obtain a first filtrate and a first filter residue. The filtrate was used as the reaction base liquid for the next leaching. The first filter residue was pumped into a dissolution tank containing deionized water. After the nickel sulfate, cobalt sulfate, and ferrous sulfate crystals precipitated by supersaturation during the reaction were re-dissolved, the solution was filtered again to obtain a second filtrate containing nickel sulfate, cobalt sulfate, and ferrous sulfate, and a second filter residue enriched with cuprous sulfide and noble metals, whereby the separation of copper from nickel and cobalt was realized. The copper content in the filtered solution was less than 0.009 g/L, and the iron was mainly in the form of divalent iron ions. The solution was placed in a sealed autoclave. Pure oxygen was introduced, and the temperature was raised to 180° C. to remove iron as hematite. The iron removed liquid was adjusted to pH 5, and cobalt was extracted with P507, and back extracted with sulfuric acid to obtain a cobalt sulfate solution, which can be used to prepare a cobalt product. The solution was then adjusted to pH 6.5, and nickel was extracted with P507, and back extracted with sulfuric acid to obtain a nickel sulfate solution, which can be used to prepare a nickel product.

The second filter residue was cuprous sulfide enriched with noble metals and having a composition mainly including: 0.16% of Ni, 72.6% of Cu, 0.95% of Fe, <0.007% of Co (amounting to a leaching rate of nickel, iron, and cobalt of more than 99%), and about 65 g/t of noble metals. The second filter residue was subjected to oxidizing roasting, and then leached with sulfuric acid, to obtain a copper sulfate solution and a leaching slag enriched with noble metals. The leaching slag enriched with noble metals was sent to a system for recovery of noble metals. The recovery rate of copper is up to 98% or higher, and the recovery rate of noble metal is over 95%. Part of the sulfur dioxide generated during the matte smelting process was reacted with hydrogen sulfide to produce sulfur, where the amount of sulfur dioxide was one half the molar amount of hydrogen sulfide; and the remaining sulfur dioxide was sent to the sulfuric acid system to produce sulfuric acid which was formulated into the reaction base liquid and leaching reaction solution.

Enbodiment 3

A copper-nickel sulfide ore was subjected to matte smelting to obtain a low-grade nickel matte including mainly 16.55% of Ni, 10.32% of Cu, 33.44% of Fe, 0.34% of Co, and about 11 g/t of noble metals, and sulfur dioxide was generated at the same time.

A 20 wt % sulfuric acid solution was formulated and used as a reaction base liquid, and a 60 wt % sulfuric acid solution was formulated and used as a leaching reaction solution. A reactor was filled with the reaction base liquid that is 30% based on the total volume of the reactor. Then, a low-grade nickel matte and the leaching reaction solution were added concurrently to the reactor and reacted, and the consumption of sulfuric acid in the reactor was maintained in accordance with the amount added. The materials were continuously fed and reacted, until the slurry in the reactor reached 80% of the total volume of the reactor. At this time, the feed was stopped, the reaction was continued for an additional 0.5 h, and the gaseous hydrogen sulfide formed during the reaction was collected.

After the completion of the reaction, the slurry was cooled to room temperature and then filtered to obtain a first filtrate and a first filter residue. The filtrate was used as the reaction base liquid for the next leaching. The first filter residue was pumped into a dissolution tank containing deionized water. After the nickel sulfate, cobalt sulfate, and ferrous sulfate crystals precipitated by supersaturation during the reaction were re-dissolved, the solution was filtered again to obtain a second filtrate containing nickel sulfate, cobalt sulfate, and ferrous sulfate, and a second filter residue enriched with cuprous sulfide and noble metals, whereby the separation of copper from nickel and cobalt was realized. The copper content in the filtered solution was less than 0.006 g/L, and the iron was mainly in the form of divalent iron ions and could be directly oxidized by 30%-50% of oxygen-enriched air without reduction while the pH of the solution was maintained at 3-4, so that the iron was precipitated and removed in the form of goethite. The obtained iron slag was calcined into an iron concentrate, which can be used for iron making. The iron removed liquid was adjusted to pH 5, and cobalt was extracted with Cyanex272, and back extracted with hydrochloric acid to obtain a cobalt chloride solution, which can be used to prepare a cobalt product. The solution was then adjusted to pH 6.5, and nickel was extracted with Cyanex272, and back extracted with hydrochloric acid to obtain a nickel chloride solution, which can be used to prepare a nickel product.

The second filter residue was cuprous sulfide enriched with noble metals and having a composition mainly including: 0.12% of Ni, 76.4% of Cu, 0.62% of Fe, <0.008% of Co (amounting to a leaching rate of nickel, iron, and cobalt of more than 99%), and about 78 g/t of noble metals. The second filter residue was subjected to oxygen pressure leaching in an autoclave, to obtain a copper-containing solution for copper making, and the leaching slag was used for the recovery of noble metals. The recovery rate of copper is up to 98% or higher and the recovery rate of noble metals is up to 95% or higher. Part of the sulfur dioxide generated during the matte smelting process was reacted with hydrogen sulfide to produce sulfur, where the amount of sulfur dioxide was one half the molar amount of hydrogen sulfide; and the remaining sulfur dioxide was sent to the sulfuric acid system to produce sulfuric acid which was formulated into the reaction base liquid and leaching reaction solution.

Enbodiment 4

A copper-nickel sulfide ore was subjected to matte smelting to obtain a low-grade nickel matte including mainly 12.55% of Ni, 8.32% of Cu, 39.44% of Fe, 0.24% of Co, and about 10.8 g/t of noble metals, and sulfur dioxide was generated at the same time.

A 60 wt % sulfuric acid solution was formulated and used as a reaction base liquid, and a 95 wt % sulfuric acid solution was formulated and used as a leaching reaction solution. A reactor was filled with the reaction base liquid that is 60% based on the total volume of the reactor. Then, a low-grade nickel matte and the leaching reaction solution were added concurrently to the reactor and reacted, and the consumption of sulfuric acid in the reactor was maintained in accordance with the amount added. The materials were continuously fed and reacted, until the slurry in the reactor reached 80% of the total volume of the reactor. At this time, the feed was stopped, the reaction was continued for an additional 2 h, and the gaseous hydrogen sulfide formed during the reaction was collected.

After the completion of the reaction, the slurry was cooled to room temperature and then filtered to obtain a first filtrate and a first filter residue. The filtrate was used as the reaction base liquid for the next leaching. The first filter residue was pumped into a dissolution tank containing deionized water. After the nickel sulfate, cobalt sulfate, and ferrous sulfate crystals precipitated by supersaturation during the reaction were re-dissolved, the solution was filtered again to obtain a second filtrate containing nickel sulfate, cobalt sulfate, and ferrous sulfate, and a second filter residue enriched with cuprous sulfide and noble metals, whereby the separation of copper from nickel and cobalt was realized. The copper content in the filtered solution was less than 0.004 g/L, and the iron was mainly in the form of divalent iron ions. The solution was directly placed in a sealed autoclave without reduction. Pure oxygen was introduced, and the temperature was raised to 220° C. to remove iron as hematite. The iron removed liquid was adjusted to pH 5.5, and cobalt was extracted with Cyanex272, and back extracted with sulfuric acid to obtain a cobalt sulfate solution, which can be used to prepare a cobalt product. The solution was then adjusted to pH 7, and nickel was extracted with Cyanex272, and back extracted with sulfuric acid to obtain a nickel sulfate solution, which can be used to prepare a nickel product.

The second filter residue was cuprous sulfide enriched with noble metals and having a composition mainly including: 0.11% of Ni, 72.3% of Cu, 0.40% of Fe, <0.004% of Co (amounting to a leaching rate of nickel, iron, and cobalt of more than 99%), and about 75 g/t of noble metals. The second filter residue was subjected to oxygen pressure leaching in an autoclave, to obtain a copper-containing solution for copper making, and the leaching slag was used for the recovery of noble metals. The recovery rate of copper is up to 98% or higher and the recovery rate of noble metals is up to 95% or higher. Part of the sulfur dioxide generated during the matte smelting process was reacted with hydrogen sulfide to produce sulfur, where the amount of sulfur dioxide was one half the molar amount of hydrogen sulfide; and the remaining sulfur dioxide was sent to the sulfuric acid system to produce sulfuric acid which was formulated into the reaction base liquid and leaching reaction solution.

What is claimed is:

1. A method for comprehensive recovery and utilization of copper-nickel sulfide ore, comprising the following steps:
   1) selective leaching, comprising:
   obtaining a nickel-iron-cobalt-enriched leachate and a copper-enriched leaching slag by selective leaching, wherein
   the selective leaching is atmospheric non-oxidative leaching and is a method for recovering the main accompanying elements from copper-nickel sulfide ore, which comprises the following selective leaching steps:
   selectively leaching by continuously adding low-grade nickel matte obtained by matte smelting of copper-nickel sulfide ore and a leaching reaction solution to a reaction base liquid in a reaction vessel, and collecting gaseous hydrogen sulfide, a first leachate, and a first leaching slag respectively, wherein the reaction base liquid is a 20-60 wt % sulfuric acid solution, and the leaching reaction solution is a 60-95 wt % sulfuric acid solution; and adding water to dissolve the first leaching slag, and collecting a second leachate and a second leaching slag respectively,
   wherein the second leachate is a nickel-iron-cobalt-enriched leachate; and the second leaching slag is a copper-enriched leaching slag;
   2) removing iron from the nickel-iron-cobalt-enriched leachate obtained in the step 1), and collecting an iron removed liquid and an iron residue respectively, wherein the iron removed liquid is used for the extraction of nickel and cobalt, and the iron residue is used for iron making; and/or
   smelting the copper-enriched leaching slag obtained in the step 1) in a copper smelting system to obtain copper and noble metals, respectively.

2. The method according to claim 1, wherein in the step 1), the leaching reaction solution is a 85-90 wt % sulfuric acid solution.

3. The method according to claim 1, wherein in the step 1), the low-grade nickel matte and the leaching reaction solution are continuously added concurrently, and the amounts added are the same as the consumption; and the first leachate is returned back and recycled as a reaction base liquid for the next batch of materials.

4. The method according to claim 1, wherein in the step 1), the leaching is continued for 0.5-2 h, after the low-grade nickel matte and the leaching reaction solution in the reaction vessel reach 80% of a total volume of the reaction vessel.

5. The method according to claim 1, wherein a sulfur dioxide generated in the matte smelting of copper-nickel sulfide ore is reacted with the gaseous hydrogen sulfide generated in the step 1) to prepare sulfur, and the remaining sulfur dioxide is converted into a sulfuric acid solution for use in the atmospheric selective leaching in the step 1).

6. The method according to claim 1, wherein in the step 2), the iron removal from the leachate is specifically:
   introducing an oxygen-rich gas into the nickel-iron-cobalt-enriched leachate or the nickel-iron-cobalt-enriched leachate having a pH adjusted to 3 to 7, to obtain an iron removed liquid and an iron residue; or
   adding the nickel-iron-cobalt-enriched leachate to an autoclave and reacting with an oxidizing gas, after the reaction is completed, performing solid-liquid separation, wherein the filter residue is washed and dried to obtain an iron residue; and the obtained filtrate is an iron removed liquid.

7. The method according to claim 1, wherein the use of the iron removed liquid for the extraction of nickel and cobalt comprises specifically:
   adjusting the pH of the iron removed liquid to 4.0-5.5, and then adding an extracting agent to the iron removed liquid, obtaining a cobalt-containing solution and a nickel-containing solution after extraction and separation, adjusting the nickel-containing solution to pH 5.5-7.0, and extracting nickel with the extracting agent, wherein the extracting agent is a 10-50 vol % solution of mono(2-ethylhexyl) 2-ethylhexylphosphonate or bis(2,4,4-trimethylpentyl)phosphinic acid in kerosene.

8. The method according to claim 1, wherein the method for recovering copper and noble metals specifically comprises:
   subjecting the copper-enriched leaching slag obtained by treating the low-grade nickel matte to matte converting to produce crude copper, which is then electrolyzed to obtain refined copper and an anode slime enriched with noble metals respectively, wherein the anode slime is used for extracting noble metals; or
   subjecting the copper-enriched leaching slag obtained by treating the low-grade nickel matte to oxidizing roasting and then to acid leaching, to collect a copper-enriched leachate and a noble metal-enriched leaching slag separately, wherein the leaching slag is used for extracting noble metals; or subjecting the copper-enriched leaching slag obtained by treating the low-grade nickel matte to oxygen pressure leaching, to collect a copper-enriched leachate and a noble metal-enriched leaching slag separately, wherein the leaching slag is used for extracting noble metals.

\* \* \* \* \*